Patented Aug. 19, 1930

1,773,101

UNITED STATES PATENT OFFICE

WILLIAM C. GEER, OF AKRON, OHIO, ASSIGNOR TO THE B. F. GOODRICH COMPANY, OF NEW YORK, N. Y., A CORPORATION OF NEW YORK

IMPREGNATING COMPOSITION AND METHOD OF PREPARING AND USING THE SAME

No Drawing.   Application filed August 17, 1922.   Serial No. 582,547.

This invention relates to compositions of matter and especially to substances suitable for coating or impregnating articles or materials for their preservation or to render them impermeable to fluids such as oil, water, and gases.

Its chief object is to provide an improved substance of the character referred to and an improved method of preparing and applying it. A more specific object is to provide an oil-resisting softener for chlorinated rubber. A further object is to provide an improved, convenient and effective method of producing a body, film or impregnation containing vulcanized or oxidized oil.

In brief my invention, in its preferred form, and in its preferred use, comprises dissolving a suitable drying, vulcanizable or oxidizable oil, such as rape, linseed, tung, or corn oil together with a gum, preferably chlorinated rubber or a varnish resin, in a solvent such as benzene, vulcanizing or oxidizing the oil in solution, as by adding sulfur chloride, applying the solution of vulcanized or oxidized oil and gum to the article or material, and permitting the solvent or solvents to evaporate, leaving the previously vulcanized or oxidized oil, together with such gum or resin as may be used, in association with the article or material. The oil, being stiffened by the vulcanization or oxidation, adheres to the article as a tough, oil-resisting substance, presenting a dry surface.

While the solution containing the vulcanized or oxidized oil may be applied, as to cloth or paper, with the advantage that an oil-resisting and water resisting coating or impregnation may thus be applied more quickly than if the vulcanization were left until after the application of the solution. I do not wholly limit my claims to vulcanizing or oxidizing the oil in solution before its application, since it may be vulcanized after application, as by treatment with sulfur chloride, within certain phases of my invention.

Neither do I limit myself wholly to vulcanizing the oil with sulfur chloride, as I may vulcanize the oil by heating the oil solution with sulfur under proper conditions to cause vulcanization and avoid loss of solvent by evaporation, or air may be blown through the solution in a closed vessel under pressure and the oil thus oxidized, and I do not wholly limit myself to mixing the gum with the oil solution before vulcanizing the latter.

Where a very high degree of flexibility is required, I preferably use, in conjunction with the oil, a solution of rubber such as a rubber cement, and in case hardness is desired, I so use a varnish resin. For intermediate conditions of hardness or flexibility and especially where great toughness and resistance to fats, oils and alkalies is desired I preferably use with the oil derivatives of rubber having greater hardness than rubber at ordinary temperatures of which chlorinated rubbers, such as the hepta-chloride, dihydrochloride or chlorinated dihydrochloride of rubber, are examples. These substances are referred to in the claims generally as hardened rubber.

By way of example, where chlorinated rubber is to be used, I preferably dissolve 5 grams of rubber hepta-chloride in 25 grams of benzene, to which is added one gram of sulfur chloride and then 5 grams of the oil, and these ingredients are then rapidly and thoroughly mixed, usually resulting in a gel, which may be thick, but which is not lumpy, and may be spread upon a material to be oil- or water-proofed, such as cardboard.

To facilitate the spreading of the gel, it may be beaten up either alone or in the presence of additional solvent, depending upon its concentration, to disintegrate it, producing a plastic gel on the order of a fruit jelly which has been softened by mashing, as in spreading it upon bread.

The gelling of the solution usually takes from several hours to several days, depending upon the oil used and the proportion of solvent and vulcanizing agent, and it may be spread upon the material to be coated or impregnated before it has completely gelled. In its softer condition it may be applied as a varnish by means of either a bristle brush or an air brush or spray. On evaporation of the solvents there is left, whatever method of application may be used, a light, tough, flexible film which is highly resistant to water, oils, acids and alkalies.

This improved coating and impregnating substance is particularly valuable in treating paper or cardboard containers for foodstuffs, especially those containing fats or oils. or containers for acid or alkaline substances It is also valuable as an acid resisting varnish for metals. and as a dope for balloon fabric, to resist the diffusion of hydrogen. By hardening a substantial quantity of the substance, as by evaporating the solvent from a body of it, the residue may be obtained in suitable form for many uses in the place of celluloid, ebonite, etc.

It will be understood by those skilled in the art that the so-called oxidizing or drying oils are in general capable of being stiffened by the addition of sulfur, sulfur chloride or chlorine, and that while the addition of these or similar chemical elements or compounds to the oil is commonly referred to as vulcanizing the oil, they are in a chemical sense properly referred to as oxidizing substances. In the appended claims the word oxidize and its derivatives are intended to include the addition of oxidizing agents other than oxygen, as well as oxygen, and the word vulcanize and its derivatives to include broadly the hardening of drying oils whether by oxidation or other chemical reaction.

While I have described my invention in its preferred phases, I do not limit it wholly to the specific substances and steps described, as various modifications within its scope may be employed.

I claim:

1. A composition of matter comprising, in intimate mixture, a drying oil stiffened by vulcanization and a material selected from a group consisting of the rubber chlorides, rubber hydrochlorides and chlorinated hydrochlorides of rubber.

2. A composition of matter comprising, in intimate mixture, an oxidized oil and chlorinated rubber.

3. A composition of matter comprising the evaporation residuum of a solution of a vulcanizable oil stiffened by vulcanization and material selected from the group consisting of the rubber chlorides, rubber hydrochlorides and chlorinated hydrochlorides of rubber.

4. A composition of matter comprising the evaporation residuum of a solution of a drying oil stiffened by vulcanization, and chlorinated rubber.

5. The method of producing a composition of matter which comprises dissolving chlorinated rubber and a vulcanizable drying oil in a volatile solvent and adding sulfur chloride to the solution.

6. The method of producing a composition of matter which comprises dissolving chlorinated rubber and a vulcanizable oil in a volatile solvent, adding sulfur chloride to the solution, permitting the sulfur chloride to vulcanize the oil, adding an evaporable solvent to the mass, and causing the mass to solidify by evaporation of the solvent or solvents.

7. The method of producing a composition of matter which comprises substantially the following: dissolving 5 parts by weight of rubber hepta-chloride in 50 parts of benzene, and adding one part of sulfur chloride and 5 parts of a vulcanizable drying oil to the solution.

8. A composition of matter comprising, in intimate mixture, a vegetable oil stiffened by vulcanization and a material selected from the group consisting of the rubber chlorides, rubber hydrochlorides and chlorinated hydrochlorides of rubber.

9. A composition of matter comprising, in intimate mixture, an oxidized vegetable oil and chlorinated rubber.

10. A composition of matter comprising, in intimate mixture, an oxidized vegetable oil and a material selected from the group consisting of the rubber chlorides, rubber hydrochlorides and chlorinated hydrochorides of rubber.

11. A composition of matter comprising the evaporation residuum of a solution of a vegetable oil stiffened by vulcanization and a material selected from the group consisting of rubber chlorides, rubber hydrochlorides and chlorinated hydrochlorides of rubber.

12. A composition of matter comprising the evaporation residuum of a solution of an oxidized vegetable oil and chlorinated rubber.

13. A composition of matter comprising the evaporation residuum of a solution of a vegetable oil stiffened by vulcanization and chlorinated rubber.

14. The method of producing a composition of matter which comprises dissolving chlorinated rubber and a vulcanizable vegetable oil in a volatile solvent and adding sulfur chloride to the solution.

15. The method of producing a composition of matter which comprises dissolving chlorinated rubber and a vulcanizable vegetable oil in a volatile solvent and adding sulfur chloride to the solution, permitting the sulfur chloride to vulcanize the oil, adding an evaporable solvent to the mass, and causing the mass to solidify by evaporation of the solvent or solvents.

16. The method of producing a composition of matter which comprises substantially the following: dissolving 5 parts by weight of rubber hepta-chloride in 50 parts of benzene, and adding 1 part of sulfur chloride and 5 parts of a vulcanizable vegetable oil to the solution.

17. A composition of matter comprising, in intimate admixture, an oil selected from a class consisting of oxidized oils and vulcanized oils, and chlorinated rubber.

18. A composition of matter comprising an oil selected from a class consisting of oxidized drying oils and vulcanized drying oils, and chlorinated rubber.

19. A composition of matter comprising an oil selected from a class consisting of oxidized vegetable oils and vulcanized vegetable oils, and a material selected from a class consisting of rubber chlorides, rubber hydrochlorides and chlorinated hydro-chlorides of rubber.

20. A composition of matter comprising the evaporation residuum of a solution of chlorinated rubber and an oil selected from a class consisting of oxidized oils and vulcanized oils.

21. A composition of matter comprising the evaporation residuum of a solution of chlorinated rubber and an oil selected from a class consisting of oxidized vegetable oils and vulcanized vegetable oils.

22. A composition of matter comprising, in intimate mixture, a vulcanizable oil stiffened by the chemical addition of an oxidizing agent, and a material selected from the group consisting of the rubber chlorides, rubber hydrochlorides and chlorinated hydrochlorides of rubber.

23. A composition of matter comprising the evaporation residuum of a solution of a vulcanizable oil stiffened by the chemical addition of an oxidizing agent, and a chlorinated rubber.

In witness whereof I have hereunto set my hand this 29th day of July, 1922.

WILLIAM C. GEER.